Jan. 9, 1934.   W. R. HELWEGE   1,942,696
ICE CREAM FREEZER CONSTRUCTION
Filed Sept. 1, 1932
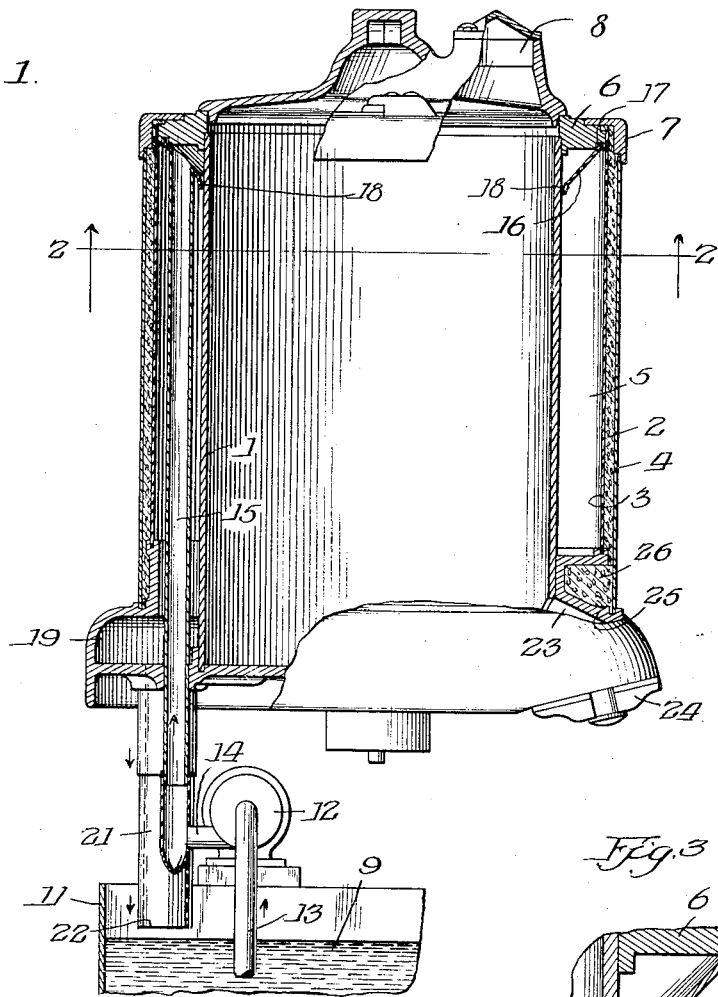
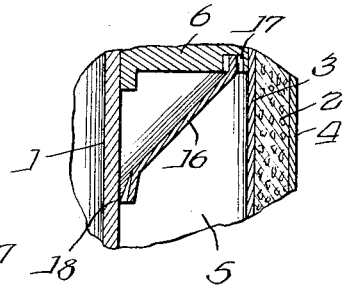
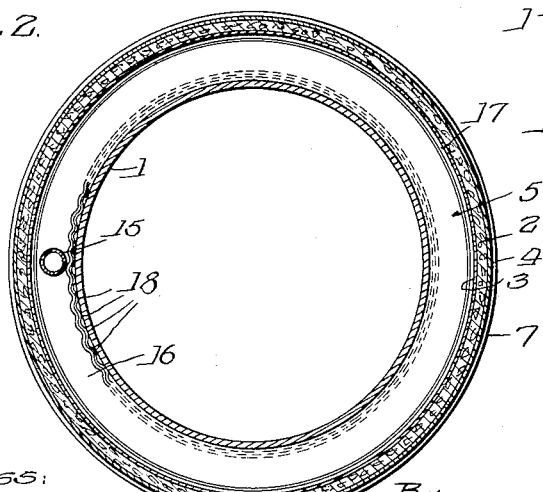
Inventor:
Walter R. Helwege Patented Jan. 9, 1934

1,942,696

UNITED STATES PATENT OFFICE 1,942,696

ICE CREAM FREEZER CONSTRUCTION

Walter R. Helwege, Beloit, Wis., assignor to Taylor Freezer Corporation, Beloit, Wis., a corporation of Delaware Application September 1, 1932. Serial No. 631,333

5 Claims. (Cl. 257—212)

This invention pertains to improvements in the construction of ice cream freezers and in particular to apparatus for obtaining a high efficiency in the use of brine or other cooling medium or agent in the cooling of a freezer.

In a freezer embodying this invention a vertical cylindrical cream chamber is provided surrounded by a brine chamber of generally annular shape through which the brine for cooling the cream can is flowed. It is preferred that the brine be caused to flow downwardly along the outside of the cream can wall in a relatively thin film, for from this procedure many advantages are derived which will later be described. Quick drainage of the brine chamber is also desired in accordance with the preferred manner of using this invention.

It is, therefore, one of the objects of this invention to provide a brine distributing apparatus for an ice cream freezer constructed to deliver a thin downwardly flowing film of brine on the outside of the cream can walls.

Another object of this invention is to provide a brine distributing system for an ice cream freezer which will distribute the brine uniformly and efficiently through such portions of the freezer as require it and at the same time prevent both excessive or wasted refrigeration.

Other numerous objects and advantages of the invention should become apparent from a perusal of this specification and the drawing forming a part hereof.

In the drawing:

Fig. 1 is a vertical central section showing a freezer embodying the invention, with the dasher mechanism eliminated, Fig. 2 is a sectional view on a horizontal plane through the line 2—2 of Fig. 1 looking upwardly, and Fig. 3 is an enlarged fragmentary sectional view illustrating the construction of the corrugated brine distributor.

Referring now in greater detail to the drawing, the cream chamber herein shown is provided with a cylindrical wall 1, in this case being stationary. Separated therefrom and surrounding the same is an insulated wall 2 which in its preferred form is made up of two metal walls 3 and 4 between which is located insulation of suitable character, such as cork. The brine chamber 5 thereby formed between the outer insulated wall and the cream can wall extends substantially the full height of the cream chamber and is closed at its top by the annular ring 6 all of which is retained in fixed position and neatly covered by a collar 7. The construction of the cover is not related to this invention and requires no description beyond the remark that in a freezer of this construction a filling opening is provided at 8 for top filling of the chamber. Located below the freezer in some convenient position, for example as in the cabinet on which an upright freezer of this general character is mounted and shown in the United States Letters Patent No. 1,760,217, issued May 27, 1930, to Charles Taylor, is a body of brine 9 in a suitable container 11. Mounted in fixed position with relation to the container is a brine pump 12 driven preferably by an electric motor, not herein shown as it is not a part of this invention.

The brine pump lifts brine through the pipe 13 and impels it through the pipe 14 and riser 15 into a brine distributing ring generally indicated as 16 which is of generally conical shape and mounted at the top of the brine chamber in inverted position. The top edge of this distributing ring is sealed in any suitable manner in the heavy frame ring 6, as for example by solder 17, while the lower edge of this conical device is crimped as shown particularly in Figs. 2 and 3 so that at closely spaced intervals it touches the circumference of the cream chamber at the points 18 and between such points of contact is curved outwardly therefrom a short distance to permit the downward discharge of brine. As the riser 15 is connected and sealed to this brine distributing ring it is, therefore, possible, by applying a small amount of pressure on the inflowing brine, to keep this inverted conical distributor full of brine and cause a very large number of small streams of brine to issue without splashing from the bottom thereof, adhering to and flowing downwardly over the circumference of the cream can wall. These small streams, however, are so close together that when they emerge from the brine ring they immediately join and form a continuous film of uniform thickness over the entire circumference of the cream can.

The crimping of the bottom edge of the conical distributor makes the edge somewhat resilient and expansible and permits it to be slid snugly upon the exterior of the cream can assuring that all points which should touch the cream can will do so and that the apertures will be uniform in size so that the film of brine delivered therefrom will likewise be of uniform thickness. Thus the cream can will receive uniform cooling around its entire circumference.

As the brine flows downwardly along the cream chamber wall it eventually accumulates in the annular channel 19 from which it drains through a drain pipe 21 back into the body of brine. The lower end 22 of the drain pipe is located just barely above the level of the body of brine to prevent undue splashing of the returning brine and yet to allow air to be freely expelled from this pipe, and as well to flow back into this pipe when the brine chamber of the freezer is being drained.

For discharging the frozen or partially frozen cream from the freezer, a discharge spout 23 of substantially elliptical cross section is provided, the outer end of which is closed by any suitable valve or gate 24, the latter not being a part of this invention. However, it is very important that this discharge spout be maintained during and immediately subsequent to the freezing operation within quite a definite temperature range so that cream which may be eddying within the area of this spout during the freezing operation may not become unduly hardened or unduly softened, and further so that during the discharge of the cream the metal wall 25 of the spout will not be so cold as to cause the outflowing cream to be frozen and thereby to clog the spout. To this end I provide a special body 26 of suitable insulation, as for example cork, which lies above the discharge spout and partially surrounds the side walls thereof, this body of insulation being interposed between the wall of the spout and the area of the brine chamber 5 which lies above and at the sides thereof. It is found that with the walls of the spout and the insulation proportioned substantially as shown in Fig. 1, sufficient cooling of the spout will be procured through the metal walls thereof while the insulation disposed in the manner shown will prevent excessive cooling.

It will be observed that the brine which cools the ice cream chamber adheres thereto and does not touch the outside insulated wall of the ice cream freezer, nor in normal operation of the freezer does it accumulate in the brine chamber. Consequently a substantial layer of air will surround the downwardly flowing film of brine and will serve to insulate it from the outside walls. Not only will refrigeration losses be thus minimized but the annoyance of frosting of the outside of the freezer is eliminated.

The above described brine distribution system cooperates admirably with the manner of using a freezer such as is shown in the Charles Taylor United States Letters Patent No. 1,760,217, issued May 27, 1930, where the cream is beaten rapidly for a few minutes while being cooled with the brine, and the brine flow is thereafter stopped while the beating is continued for a few minutes longer. The construction herein shown permits of quick draining of the brine and assures that the cream temperature will not undergo any substantial change either downwardly or upwardly, due to the quick drainage of brine and the air space insulation surrounding the cream chamber.

It should be understood that this invention is capable of being utilized in various modified forms which may differ in various respects from the disclosed preferred embodiment, without, however, departing from the spirit and scope of the invention as defined in the claims which follow.

Having shown and described my invention, I claim:

1. An ice cream freezer comprising a vertical cylindrical cream can, a conical brine distributor surrounding the upper end of said can, the lower edge of said distributor being crimped to provide portions thereof which alternately touch and alternately are spaced apart from said can to provide a plurality of adjacent small apertures, means for supplying brine to said distributor, and an insulated wall surrounding said cream can providing an air space thereabout.

2. An ice cream freezer comprising a vertical cylindrical cream can, an insulated wall surrounding the can and spaced apart therefrom providing an enclosed air space, a conical brine distributor surrounding the upper end of said can and means for closing the top of said distributor, the lower edge of said distributor being crimped and arranged with portions of the edge alternately touching and alternately spaced apart from said cream can to provide a plurality of adjacent small apertures, means for supplying brine to said distributor under pressure, and means for draining the brine from said air space.

3. An ice cream freezer comprising a vertical cylindrical cream can, an insulated wall surrounding the can and spaced apart therefrom providing thereby an insulating air space, and an inverted conical brine distributor about the upper end of said cream can, the lower edge of said distributor being formed to provide portions thereof which are alternately in contact with and spaced apart from the can exterior providing a plurality of small apertures for delivering to the exterior of the can without splahing a thin film of brine.

4. In an ice cream freezer having a vertical cylindrical cream can and an enclosed brine chamber surrounding the same, means for draining the brine from the bottom of said chamber, a cream discharge spout connected with the cream can and extending outwardly from the lower portion thereof, and a body of insulating material positioned between the brine chamber and the upper surfaces of said spout.

5. In an ice cream freezer having a vertical cylindrical cream can and an enclosed brine chamber surrounding the can, a spout connected with the lower portion of said can for discharging cream extending through said brine chamber, and insulating means separating the top wall of said spout from said chamber.

WALTER R. HELWEGE.